United States Patent
Nurmann

(10) Patent No.: US 6,560,642 B1
(45) Date of Patent: May 6, 2003

(54) METHOD OF ESTABLISHING AN INTERNET PROTOCOL NETWORK UTILIZING IP GATEWAY THAT FUNCTIONS AS EITHER OR BOTH DHCP CLIENT AND DHCP SERVER

(75) Inventor: Jens Nurmann, Aachen (DE)

(73) Assignee: ELSA AG, Aachen (DE)

( * ) Notice: Subject to any disclaimer, the term of this patent is extended or adjusted under 35 U.S.C. 154(b) by 0 days.

(21) Appl. No.: 09/425,863

(22) Filed: Oct. 23, 1999

(30) Foreign Application Priority Data

Oct. 26, 1998 (DE) .......................................... 198 49 170

(51) Int. Cl.[7] .......................................... G06F 15/177
(52) U.S. Cl. ........................ 709/220; 709/221; 709/222; 709/223; 709/224; 709/225
(58) Field of Search .................................. 709/220–225

(56) References Cited

U.S. PATENT DOCUMENTS

| | | | | |
|---|---|---|---|---|
| 5,557,748 A | | 9/1996 | Norris ....................... 395/200.1 |
| 5,875,306 A | * | 2/1999 | Bereiter ........................ 709/220 |
| 6,058,421 A | * | 5/2000 | Fijolek et al. .............. 709/225 |
| 6,070,187 A | * | 5/2000 | Subramaniam et al. ..... 709/220 |
| 6,115,545 A | * | 9/2000 | Mellquist .................... 709/220 |
| 6,185,678 B1 | * | 2/2001 | Arbaugh et al. ............... 713/2 |
| 6,230,194 B1 | * | 5/2001 | Frailong et al. ............ 709/220 |

* cited by examiner

Primary Examiner—Nabil El-Hady
(74) Attorney, Agent, or Firm—Christopher Whewell

(57) ABSTRACT

This invention relates to a method of establishing an Internet Protocol network with several IP hosts and with an IP gateway for connecting the IP network to the Internet. The invention provides a method which no longer requires the knowledge of address mechanisms of the Internet protocol previously necessary for a successful establishment and thus protects disturbances of errors during the establishment of an Internet Protocol network.

12 Claims, 4 Drawing Sheets

METHOD OF ESTABLISHING AN INTERNET PROTOCOL NETWORK UTILIZING IP GATEWAY THAT FUNCTIONS AS EITHER OR BOTH DHCP CLIENT AND DHCP SERVER

FIELD OF THE INVENTION

The present invention relates to a method of establishing an Internet Protocol ("IP") network with several IP hosts and with an IP gateway for connecting the IP network to the internet.

BACKGROUND INFORMATION

Explanation of the concepts used in conjunction with the invention:

| | |
|---|---|
| IP address | An IP address is a 32-bit number which is regularly represented with four number separated by dots in the so-called "dotted notation". Each of these numbers describes a complete bite 8 bits wide. The 32-bit number contains a network address as well as a host address which are held apart from one another by the IP network mask (See "IP network mask" for explanation). |
| IP network mask | An IP network mask is a 32-bit number represented analogously to an IP address. It keeps the network address and the host address in the IP address apart from one another by logical AND operation, that is, all 1 bits of the network mask define the part of the IP address which belongs to the network address. (If the network mask is, e.g., 255.0.0.0; 255 = 128 + 64 + 32 + 16 + 8 + 4 + 2 + 1 ⇔ decimal = 1 1 1 1 1 1 1 1 binary, the 8 front bits are set. If the network mask 255.0.0.0 is now logically "AND" linked, e.g., with an IP address 10.0.0.4, the result is 10.0.0.0. This result is then the network address whereas the host address is the entire IP address 10.0.0.4. The mode of expression: Host 0.0.4 in the network 10.0.0.0 is also customary. |
| IP stack | An IP stack is a method which makes possible the processing of IP data packets according to TCP/IP-based protocols (TCP/IP: Abbreviation for Transmission Control Protocol/Internet Protocol) in a computer. The open standards - also called RFC (RFC: Abbreviation for "requests for comments") - contain all definitions of the TCP/IP-based protocols. The RFC's are numbered consecutively and are available free of charge, e.g., via the Internet. RFC's are never changed. There are at the most supplementary or replacing RFC's. |
| IP host | An IP host is a computer in which an IP stack has been installed. |
| IP gateway | An IP gateway is a computer which can execute the switching of IP data packets between a computer and a network, here the Internet. This computer is provided with an IP stack so that it can convert the IP data packets from one transmission medium to another transmission medium, e.g., from a LAN (LAN: Abbreviation for Local Area Network) to an WAN (WAN: Abbreviation for Wide Area Network). |
| IP network | An IP network consists of several IP hosts and an IP gateway linked to each other for a data transmission. |

Several possibilities are known from the state of the art for establishing an IP network:

The user manually allocates an IP address and an IP network mask to each IP host in the IP network. Each additional IP host which is to be tied into the IP network therefore requires an additional establishing cost. The working cost includes the fact that the user must know and have understood the address mechanisms of the Internet protocol since an erroneous establishment of individual IP hosts can absolutely result in a disturbance in the entire IP network. If the user desires to connect the IP network to the Internet he requires an IP gateway for this whose IP address must also be entered manually in each IP host of the IP network.

Usually, additional IP addresses are entered into each IP host, converted into symbolic names, e.g., for the Domain Name Service (DNS in short) of the IP addresses and vice versa. The Domain Name Service is practically indispensable when working in the Internet.

Another possibility for a new establishment of an IP network is that the user allocates an IP address and an IP network mask to only one IP host and uses this IP host for allocating IP addresses and IP network masks to additional IP hosts in the IP network. This is carried out by means of DHCP (DHCP: Abbreviation for Dynamic Host Configuration Protocol), which must be installed in the host. The DHCP is defined via RFC 2131 and RFC 2132 (See the explanations for "'RFC"). The IP host established manually by the user functions as DHCP server for the additional IP hosts, the DHCP clients. The allocation of the IP addresses to the IP hosts functioning as DHCP clients takes place from the DHCP server, in which the user transfers IP addresses left on the DHCP server from the latter to the DHCP clients=IP hosts. This applies to the IP addresses of the IP hosts as well as to additional IP addresses, e.g., of a DNS server. The connection of the IP gateway to the IP network nevertheless requires a manual establishment since the IP gateway can not be established from a DHCP server. Even in this method of establishing an IP network the user must know and have understood the address mechanism of the Internet protocol. Only the establishing cost for the IP hosts is eliminated.

Therefore, a central disadvantage of the known methods is the fact that the user must know and have understood the address mechanisms of the Internet protocol for a successful establishment of the IP network. Any errors in the establishment can absolutely result in a disturbance in the entire IP network. The known methods are therefore not suited for users without considerable knowledge of the Internet protocol.

The invention therefore has the basic problem of creating a method of establishing an IP network with several IP hosts and with an IP gateway which method requires no knowledge of the address mechanisms of the Internet protocol for a successful establishment and therewith protects against disturbances, resulting from errors during the establishing.

The solution of this problem makes use of the fact that all information necessary for establishing an IP network with Internet connection converge in the IP gateway.

The invention is also based on the concept, contrary to the traditional method, of at first not using a DHCP server for the establishment but rather of allowing the IP gateway to find out in the non-established state as DHCP client whether there is a DHCP server in the IP network already. If there is no DHCP server the IP gateway is activated automatically as DHCP server. The software (IP stack) for this is implemented in the firmware of the gateway so that the user is not burdened with the installation. The activated DHCP server allocates IP addresses and IP network masks to the IP hosts in a standard manner from a reserved address range so that the IP hosts and the IP gateway can exchange IP data packets with each other. Exclusively IP addresses which) are not given out in the Internet for IP hosts are normally located in the reserved address range.

The problem is solved by the present invention.

However, If the IP gateway discovers as DHCP client that there is a DHCP server in the IP network already the IP gateway does not activate its own DHCP server and logs off again in the found DHCP server because an establishment and administration of the IP network in a traditional way with an IP host as DHCP server is obviously intended.

DETAILED DESCRIPTION

Figure 1:
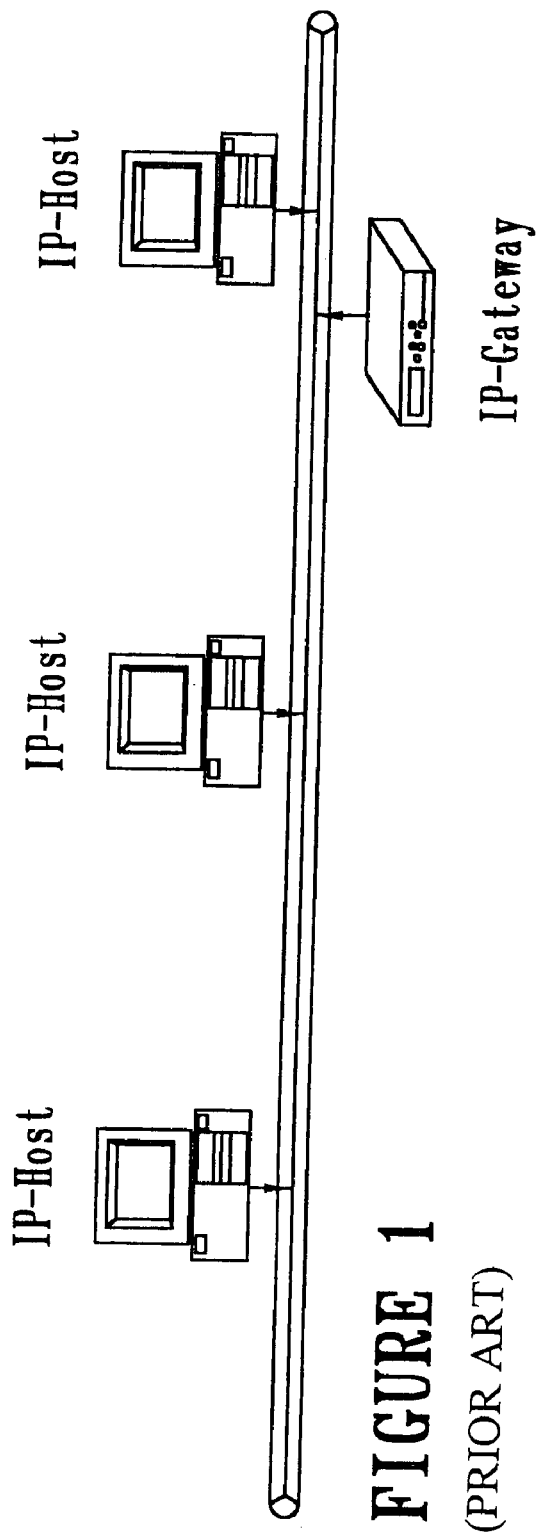
FIG. 1 shows the components of an IP network according to the prior art.

In an embodiment of the invention an access to the Internet for the individual IP hosts can be prepared in that after the allocation of IP addresses and IP network masks to at least one IP host a program for configuring the Internet access is started. The program starts a broadcast call of the IP host to an address, reserved for the broadcast call, of the IP gateway functioning as DHCP server. The configuration program allocates an IP network mask and IP address to the IP gateway from the address range reserved for this under which the gateway is detectable if a non-configured IP gateway with active DHCP server is present at the reserved address for the broadcast call.

The establishment of the Internet access for the entire IP network via only one IP host by means of the configuration program takes place as follows:

The IP host selected for the configuration determines by means of the locality criterion whether an IP address of another IP host in another IP network (target IP address) is present with which one of the IP hosts of the local IP network would like to make contact. The target IP address can be accessible, e.g., via an Internet provider or by direct connection to the other IP network. It sends all IP packets determined for IP addresses which are not located in the local IP network of the IP host selected for the configuration to its responsible default IP gateway. The IP gateway must now decide using the target IP address where it must retransmit the IP packet to. To this end there is an IP routing table in the IP gateway which defines a linking of IP addresses and targets. The configuration tool now enters a default route in the IP gateway which route transfers all IP packets with target IP addresses outside of the local IP network to an Internet provider. This takes place, e.g., in an ISDN dial connection to the Internet provider by means of the automatic design of the default route as soon as an IP packet is to be transferred to the Internet provider in case this connection is not already present.

The user receives the data necessary for the configuration, including, among other things, a DNS IP address, from his Internet provider. The access to the Internet via the Internet provider functions thereby with an address translation technology for IP addresses (known as IP masquerading) so that the IP addresses given out internally in the IP network are not passed on to the provider and into the Internet. As soon as the Internet access has been configured via the gateway, accesses to the Internet via the IP gateway are possible by any IP hosts in the IP network. The IP gateway administers thereby the IP masquerading out of and into the reserved address range as well as for inquiries for the conversion of symbolic names into IP addresses and vice versa (DNS).

The main advantage of the invention is the fact that the expense for establishment is significantly reduced since all IP addresses and IP network masks in the IP gateway necessary for the operation of the IP network have been filed in the address range reserved to this end. A further central advantage is the fact that misconfigurations are avoided since all IP addresses and IP network masks for further IP hosts in the IP network are centrally given out by the IP gateway.

The method is designed so that it can also be used without problems in already existing IP networks for their re-establishment.

FIGS. 1 to 4 are referred to in order to explain the state of the art and the invention.

In the traditional establishing of an IP network several individual configurations are necessary in the IP hosts and the IP gateway in a certain sequence before IP packets can be transmitted within the IP network and, if necessary, to another transmission medium, e.g., the Internet. FIG. 1 shows the components of an IP network which the user of traditional methods must configure.

Figure 2:
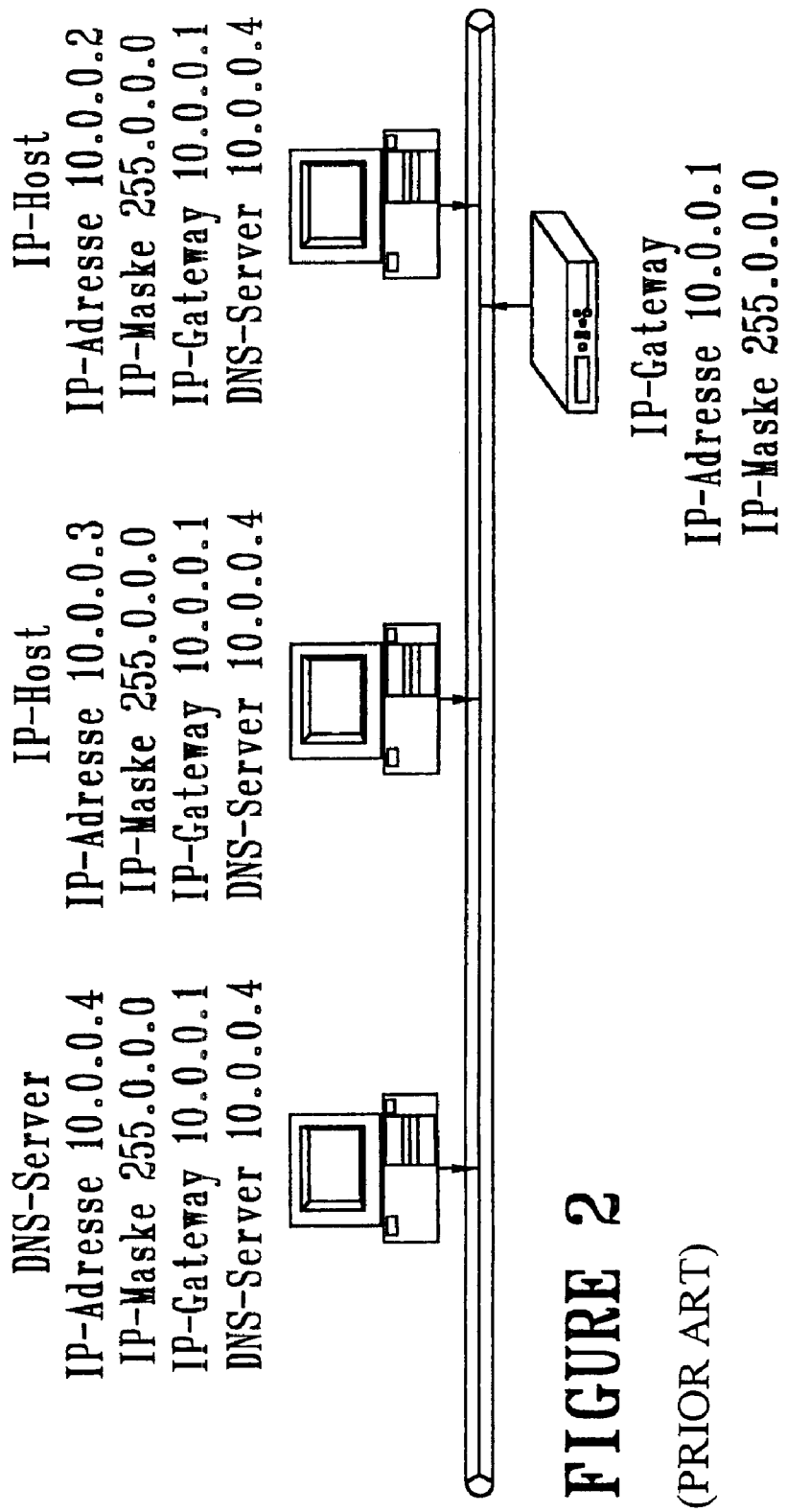
FIG. 2 shows the components of an IP network according to the prior art.

FIG. 2 shows the typical scope of a ready-configured IP network with connection to the Internet. In addition to the IP address and the IP network mask for the particular IP host the IP address of the IP gateway must be manually entered in each IP host of the IP network for the Internet connection. In addition, the address for the domain name service (DNS in short) must be entered in each IP host. The DNS converts IP addresses into symbolic names and vice versa.

Figure 3:
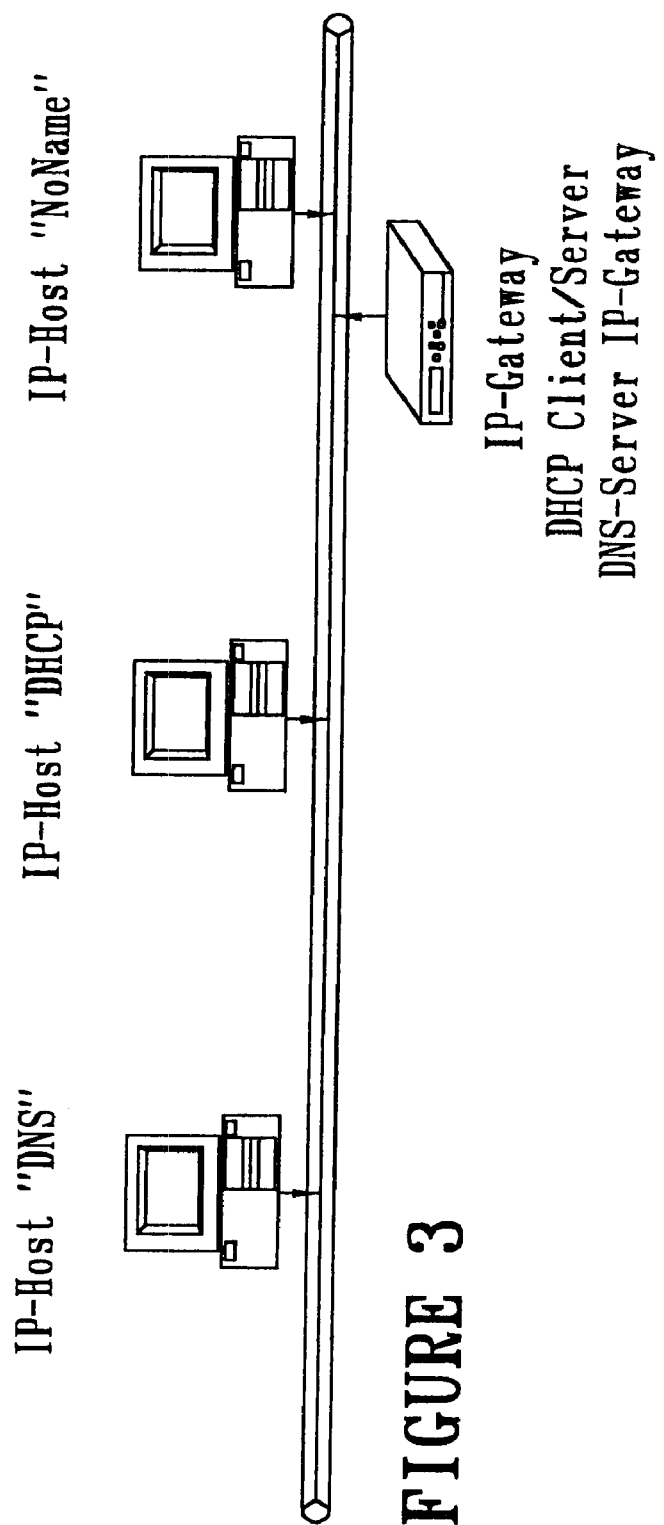
FIG. 3 shows a non-established IP network suitable for use in accordance with the present

FIG. 3 shows a non-established IP network, that is, the initial situation for the method in accordance with the invention. The symbolic names of the IP hosts "DNS, DHCP, NoName" are entered manually by the user. Usually, a modern IP stack installed in each of the connected IP hosts provides an inquiry to the user about such a symbolic name during the installation. In addition, the IP stacks can operate as a DHCP client. The IP gateway functions for the connection to the Internet.

Figure 4:
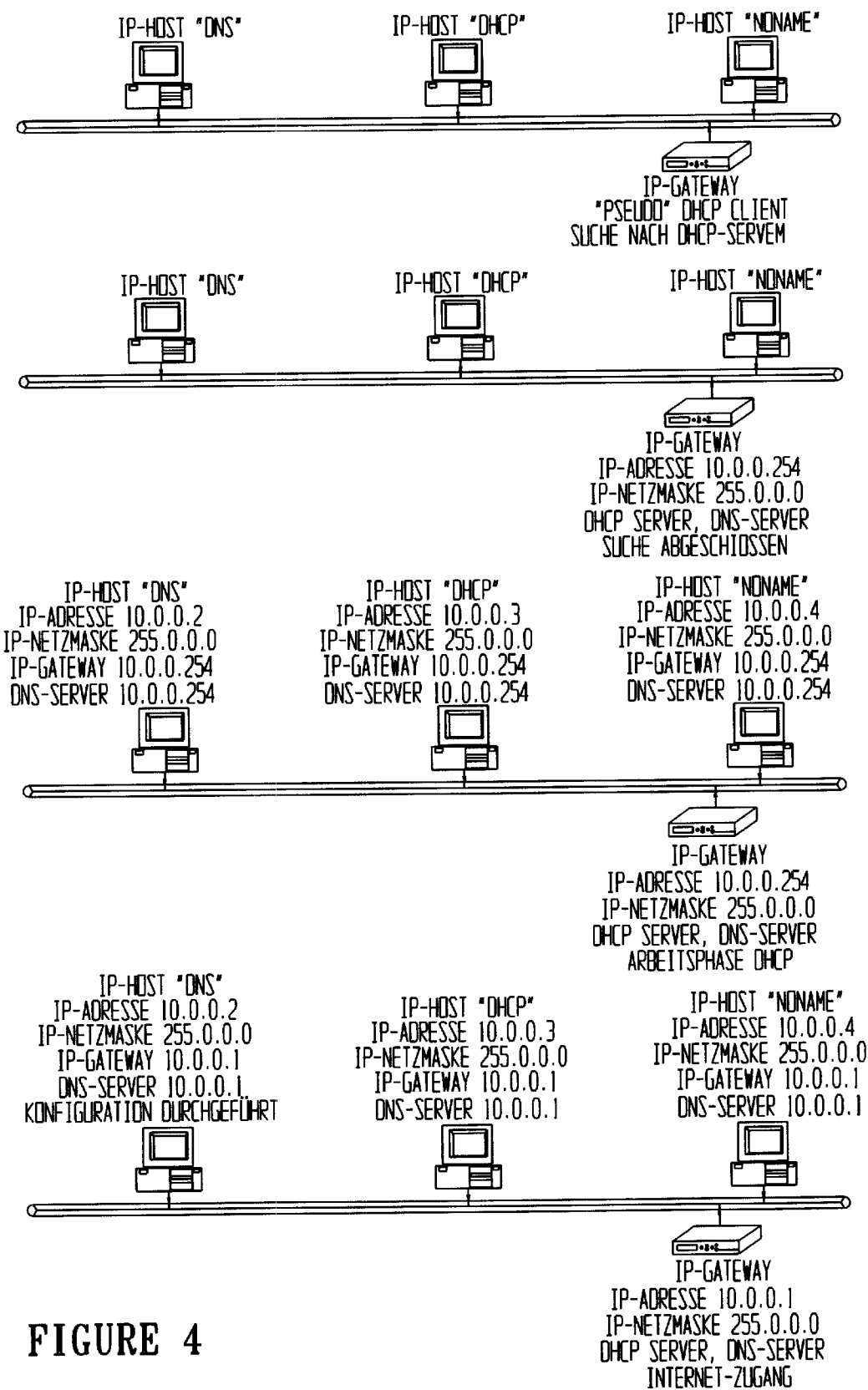
FIG. 4 shows an IP network suitable for use in accordance with the present invention.

FIG. 4 illustrates that, counter to the traditional method, at first no DHCP server is used for the establishment but rather the IP gateway finds out in the non-established state as DHCP client whether there is a DHCP server in the IP network already (first line of FIG. 4). If there is no DHCP server the IP gateway is automatically activated as a DHCP server under the IP address 10.0.0.254 with the network mask 225.0.0.0 and assures that in the future all DNS inquiries are passed on to a DNS server. As regards the local IP network with its IP hosts the IP gateway acts as a DNS server; as regards the Internet the IP gateway acts as a DNS client which routs onward the DNS inquiries of the IP hosts of the local IP network. The professional terminology states that the IP gateway establishes a DNS forwarder (second line of FIG. 4).

The activated DHCP server allocates IP addresses 10.0.0.2, 10.0.0.3, 10.0.0.4 and IP network masks 225.0.0.0 to the IP hosts "DNS, DHCP, NoName" according to the standard from a reserved address range so that the IP hosts and the IP gateway can exchange IP data packets among each other.

In addition, the access to the Internet for the IP hosts "DNS, DHCP, NoName" is prepared in that after the allocation of the IP addresses and IP network masks a program for configuring the Internet access is started, e.g., on the IP host "DNS". The program starts a broadcast call of the IP host "DNS" to an address of the IP gateway functioning as DHCP server which address is reserved for the. broadcast call. The configuration program allocates the IP network mask 255.0.0.0 and IP address 10.0.0.1 from the address range reserved for this purpose to the IP gateway under which the gateway is detectable by the IP hosts for the Internet access. A prerequisite for this is that the IP gateway has not yet been configured and that an active DHCP server is present (third line of FIG. 4).

After the conclusion of the complete configuration the IP network like the one in FIG. 4, line four, is present.

What is claimed is:

1. A method of establishing an IP network with several IP hosts and with an IP gateway for connecting the IP network to the Internet, characterized in that:

An IP stack is installed in each IP host which stack can function as a DHCP client, An IP stack is installed in the IP gateway which stack can function both as a DHCP client and as a DHCP server, After having been activated, the IP gateway functions at first as a DHCP client and checks whether a DHCP server is present in the IP network, and If no DHCP server is present in the IP network the DHCP server in the IP gateway activates itself and allocates IP addresses and IP network masks to each activated IP host from a reserved address range.

2. The method according to claim 1, characterized in that the IP address allocated to each IP host is routed onward to the Internet by means of known address translation technologies.

3. A method of establishing an IP network with several IP hosts and with an IP gateway for connecting the IP network to the Internet, characterized in that:

An IP stack is installed in each IP host which stack can function as a DHCP client, An IP stack is installed in the IP gateway which stack can function both as a DHCP client and as a DHCP server, After having been activated, the IP gateway functions at first as a DHCP client and checks whether a DHCP server is present in the IP network, and If no DHCP server is present in the IP network the DHCP server in the IP gateway activates itself and allocates IP addresses and IP network masks to each activated IP host from a reserved address range and further characterized in that after the allocation of the IP addresses and IP network masks a program for configuring the Internet access is started on at least one IP host which program starts a broadcast call of the IP host to an address, reserved for the broadcast call, of the IP gateway functioning as DHCP server and that the configuration program allocates an IP address and an IP network mask from the reserved address range to the IP gateway under which the gateway can be detected if a non-configured IP gateway with active DHCP server is present at the reserved address.

4. The method according to claim 3, characterized in that the IP address allocated to each IP host is routed onward to the Internet by means of known address translation technologies.

5. An IP network capable of being connected to the Internet, comprising:

a) a plurality of IP host computers each having a first IP stack installed therein, wherein said first IP stack is capable of functioning as a DHCP client;

b) at least one IP gateway, having a second IP stack installed therein, wherein said second IP stack is capable of functioning as either or both a DHCP client and as a DHCP server, wherein said IP gateway includes a means for determining whether a DHCP server is present in said network.

6. An IP network according to claim 5 wherein said IP gateway further includes a means for activating itself as DHCP server.

7. An IP network according to claim 5 wherein an IP gateway is functioning as DHCP server, and further comprising a means for allocating an IP address and an IP network mask to each IP host in said network.

8. An IP Network according to claim 7 wherein said IP address and said IP network mask are selected from a reserved address range.

9. A process for establishing an IP network comprising the steps of:

a) providing a plurality of IP hosts, wherein each IP host includes a first IP stack that is capable of functioning as a DHCP client;

b) providing an IP gateway connected to said hosts, wherein said gateway includes a second IP stack that is capable of functioning as either a DHCP client, or as a DHCP server;

c) causing said IP gateway to detect whether a DHCP server is present in said network;

d) causing said IP gateway to become active as a DHCP server in cases when no DHCP server is detected; and e) causing said IP gateway to allocate IP addresses and IP network masks to each IP host in said network.

10. A process for establishing an IP network comprising the steps of:

a) providing a plurality of IP hosts, wherein each IP host includes a first IP stack that is capable of functioning as a DHCP client;

b) providing an IP gateway connected to said hosts, wherein said gateway includes a second IP stack that is capable of functioning as either a DHCP client, or as a DHCP server;

c) causing said IP gateway to detect whether a DHCP server is present in said network;

d) causing said IP gateway to become active as a DHCP server in cases when no DHCP server is detected;

e) causing said IP gateway to allocate IP addresses and IP network masks to each IP host in said network; and f) initiating a program for configuring Internet access on at least one IP host, wherein said program starts a broadcast call of the IP host to an address, said address having been previously reserved for such a broadcast call, to an address of the IP gateway (when said IP gateway is functioning in its DHCP server capacity), and wherein said program allocates an IP address and an IP network mask from a reserved address range to the IP gateway through which a non-configured IP gateway may be detected when an active DHCP server is present at the reserved address.

11. The process of claim 10 wherein the IP address allocated to said IP hosts is routed to the Internet by means of known address translation technologies.

12. The process of claim 9 wherein the IP address allocated to said IP hosts is routed to the Internet by means of known address translation technologies.

* * * * *